United States Patent
Macey et al.

(10) Patent No.: US 11,533,633 B2
(45) Date of Patent: Dec. 20, 2022

(54) FREQUENCY PLANNING FOR A COMMUNICATION SYSTEM

(71) Applicant: CommScope Technologies LLC, Hickory, NC (US)

(72) Inventors: Gregory A. Macey, Leesburg, VA (US); Laura R. Fontaine, McLean, VA (US); Joseph N. Marzin, Potomac Falls, VA (US)

(73) Assignee: CommScope Technologies LLC, Hickory, NC (US)

( * ) Notice: Subject to any disclaimer, the term of this patent is extended or adjusted under 35 U.S.C. 154(b) by 89 days.

(21) Appl. No.: 16/791,251

(22) Filed: Feb. 14, 2020

(65) Prior Publication Data

US 2020/0267568 A1 Aug. 20, 2020

Related U.S. Application Data

(60) Provisional application No. 62/807,995, filed on Feb. 20, 2019.

(51) Int. Cl.
*H04W 16/18* (2009.01)

(52) U.S. Cl.
CPC .................. *H04W 16/18* (2013.01)

(58) Field of Classification Search
CPC ..... H04W 16/18; H04W 16/00; H04W 16/02; H04W 16/20; H04W 16/22; H04W 64/003; H04W 88/00; H04W 88/08; H04W 4/50; H04W 4/70; H04W 4/23; H04W 72/00; H04W 72/02; H04W 72/04; H04W 72/042; H04W 72/0406; H04W 72/044; H04W 4/00; H04W 72/0486; H04W 74/00; H04W 74/002; H04W 74/006; H04W 76/00; H04W 76/10; H04W 76/11; H04W 76/15; H04W 80/00; H04W 92/00; H04W 92/10;
(Continued)

(56) References Cited

U.S. PATENT DOCUMENTS 5,497,503 A * 5/1996 Rydberg et al. ............. 455/33.1
6,094,580 A * 7/2000 Yu et al. ....................... 455/446
(Continued)

FOREIGN PATENT DOCUMENTS

CN 108419245 A * 8/2018 ............ H04W 16/10
WO WO-2018145520 A1 * 8/2018

OTHER PUBLICATIONS

International Searching Authority, "Invitation to Pay Additional Fees from PCT Application No. PCT/US2020/018252", from Foreign Counterpart to U.S. Appl. No. 16/791,251, dated Jun. 10, 2020, pp. 1 through 7, Published: WO.
(Continued)

*Primary Examiner* — Meless N Zewdu
(74) *Attorney, Agent, or Firm* — Fogg & Powers LLC

(57) ABSTRACT

A method for frequency planning of a proposed microwave system is provided. The method includes receiving data regarding the proposed microwave system. The method further retrieves site-specific interference data from a database for a region around the proposed microwave system. The method also presents a graphical representation of frequency availability based on the received data and the retrieved data. When a user input is received, the method provides additional details on potential interference levels.

29 Claims, 11 Drawing Sheets

(58) Field of Classification Search
CPC ... H04W 72/082; H04W 16/10; H04W 16/12; H04W 28/0289; H04W 72/12; H04W 16/08; H04W 72/0453; H04W 72/046; H04W 72/048; H04W 72/08; H04W 16/14; H04W 16/24; H04W 16/28; H04L 27/2039; H04L 27/2064; H04L 41/14; H04Q 3/0083; H04Q 3/0091; H04Q 2213/13543; H04Q 2213/13544
See application file for complete search history.

(56) References Cited

U.S. PATENT DOCUMENTS

| | | | |
|---|---|---|---|
| 6,512,916 B1* | 1/2003 | Forbes, Jr. | 455/67.6 |
| 6,771,966 B1* | 8/2004 | Chow | H04W 16/18 455/75 |
| 2003/0078051 A1* | 4/2003 | Fattouch et al. | 455/452 |
| 2003/0129987 A1 | 7/2003 | Tanay et al. | |
| 2005/0245265 A1* | 11/2005 | Nascimbene et al. | H04W 16/18 455/446 |
| 2008/0207210 A1 | 8/2008 | Brusch | |
| 2010/0105408 A1* | 4/2010 | Palmer et al. | 455/454 |
| 2010/0194985 A1* | 8/2010 | Unger et al. | |
| 2012/0282962 A1 | 11/2012 | Madon et al. | |
| 2013/0102254 A1* | 4/2013 | Cyzs et al. | H04B 1/10 |
| 2013/0184022 A1 | 7/2013 | Schmidt | |
| 2015/0116145 A1* | 4/2015 | Ashjaee | G01S 19/21 342/357.4 |
| 2015/0319768 A1* | 11/2015 | Abdelmonem et al. | H04W 72/082 |
| 2015/0341798 A1 | 11/2015 | Palmer | |
| 2016/0100320 A1* | 4/2016 | Dayanandan et al. | H04W 16/18 |
| 2016/0269911 A1 | 9/2016 | Cheng et al. | |
| 2016/0380870 A1* | 12/2016 | Dudda et al. | H04L 43/16 |
| 2018/0159571 A1* | 6/2018 | Shaked et al. | H04B 1/126 |
| 2018/0368001 A1 | 12/2018 | Vanhatupa et al. | |
| 2019/0045497 A1* | 2/2019 | Negus et al. | H04W 72/046 |
| 2020/0389799 A1* | 12/2020 | Young et al. | H04W 16/18 |

OTHER PUBLICATIONS

International Searching Authority, "International Search Report and Written Opinion from PCT Application No. PCT/US2020/018252 dated Aug. 11, 2020", From PCT Counterpart of U.S. Appl. No. 16/791,251, pp. 1 through 16; Published in WO.

* cited by examiner

Band: 6.1 GHz — 704
Bandwidth: 30 MHz

DONOR SITE — 706
LATITUDE
LONGITUDE — 708
OR
FCC CALL SIGN — 710
OR
FCC ASR — 712
ANTENNA MODEL
RADIO MODEL — 714
TRANSMIT POWER
ANTENNA CENTERLINE (FT)

RECIPIENT SITE (OPTIONAL) — 716
LATITUDE
LONGITUDE
OR
FCC CALL SIGN
OR
FCC ASR
ANTENNA MODEL
RADIO MODEL
ANTENNA CENTERLINE (FT)
TRANSMIT POWER

718 —
LINE OF SIGHT REQUIRED: Y
MINIMUM SEARCH RADIUS (MI): 10
MAXIMUM SEARCH RADIUS (MI): 50
— 720

[Submit] — 722

FIG. 7

FREQUENCY PLANNING FOR A COMMUNICATION SYSTEM

CROSS REFERENCE TO RELATED APPLICATIONS

This application claims the benefit of U.S. Provisional patent application Ser. No. 62/807,995 entitled "FREQUENCY PLANNING FOR A MICROWAVE SYSTEM" (the '995 Application), filed on Feb. 20, 2019. The '995 Application is incorporated herein by reference.

BACKGROUND

A microwave path is a form of directional wireless communication from one point to another, typically in the 1-100 GHz frequency range. The most common usage today is to relay Internet Protocol (IP) traffic on cellular or private networks. The transmission of the communication signals is focused using directional antennas, and this method of wireless communication is commonly referred to as "point to point microwave". Microwave systems ideally operate with no physical obstructions between transmit and receive antennas; so-called "with line of sight conditions."

Since microwave systems are directional in nature, this presents operational challenges as well as opportunities. A challenge is that microwave antennas must be properly aligned to get the acceptable received signal level at the microwave receiver. This same directional nature of the microwave signal becomes an opportunity to allow the same frequency to be reused multiple times within the same geographic area with proper planning. For example, in the United States there are about 30,000 microwave paths in the 6.1 GHz frequency band, most of which reuse the same 8 frequencies.

The science of establishing microwave frequency reuse is known as "Frequency Planning". Frequency Planning involves analyzing the technical parameters of a path design or proposed microwave network against existing microwave networks to assign frequencies that can operate without predicted interference. Microwave path information such as transmit power, receiver filtering, antenna gain, antenna height, target performance, over the air losses, site locations, and frequency all factor into the analysis which is conducted against a database of all the incumbent registered microwave systems or links. There are several interference standards that have been established to quantify the level of interference in a microwave system and likewise many methods to mitigate such interference. In the United States, one industry standard is Telecommunications Industry Association (TIA) Bulletin 10. Internationally, the International Telecommunication Union (ITU) radio regulations recommendations are often used. The methodologies may differ somewhat from standard to standard, but the general concept of noninterference involves the desired signal being dominant enough with respect to an interfering signal such that the interferer's impact on the radio receiver is negligible.

Since a finite amount of licensed microwave spectrum exists, finding available spectrum that is not already encumbered can be a significant challenge in urban areas or areas that have many collocated microwave sites in the same frequency band. Large cities, like New York and Chicago, have thousands of point-to-point microwave paths or systems within the city proper.

Microwave spectrum has also become increasingly more congested in recent years as capacity needs of the wireless community increase. Sometimes multiple frequency pairings are needed to get the desired amount of capacity, also known as throughput. It is also becoming more commonplace to have a throughput solution that involves multiple frequency bands. This is known as multi-band carrier aggregation.

The existing method of selecting and assigning microwave spectrum is through individual analytical studies. In these studies, the frequency planner analyses a single proposed path against all other existing paths within a specified cull distance of the proposed system. The result of the analysis is an indication of which frequencies are available, if any, at the proposed site and in the proposed band. This works well for singular analyses but does not scale well for large market studies or studies that require iteration and "what-if" scenarios. Speed is the primary inhibitor in the evaluation of microwave spectrum on a large scale.

Therefore, what is needed is a process or tool for identifying spectral availability across a large geographic region in multiple frequency bands down to individual site levels or even non-developed possible greenfield sites to enable rapid analysis for planning a new communication system.

SUMMARY

A method for frequency planning of a proposed communication system is provided. The method includes receiving data regarding the proposed microwave system. The method further retrieves site-specific interference data from a database for a region around the proposed microwave system. The method also presents a graphical representation of frequency availability based on the received data and the retrieved data. When a user input is received, the method provides additional details on potential interference levels. Other embodiments are also described and claimed.

BRIEF DESCRIPTION OF THE DRAWINGS

Embodiments of the present invention can be more easily understood and further advantages and uses thereof more readily apparent, when considered in view of the description of the preferred embodiments and the following figures in which:

FIG. 7 is a schematic diagram of one embodiment of a user interface for a frequency planning tool for new microwave systems using the site-based interference methodology.

DETAILED DESCRIPTION

Figure 1:
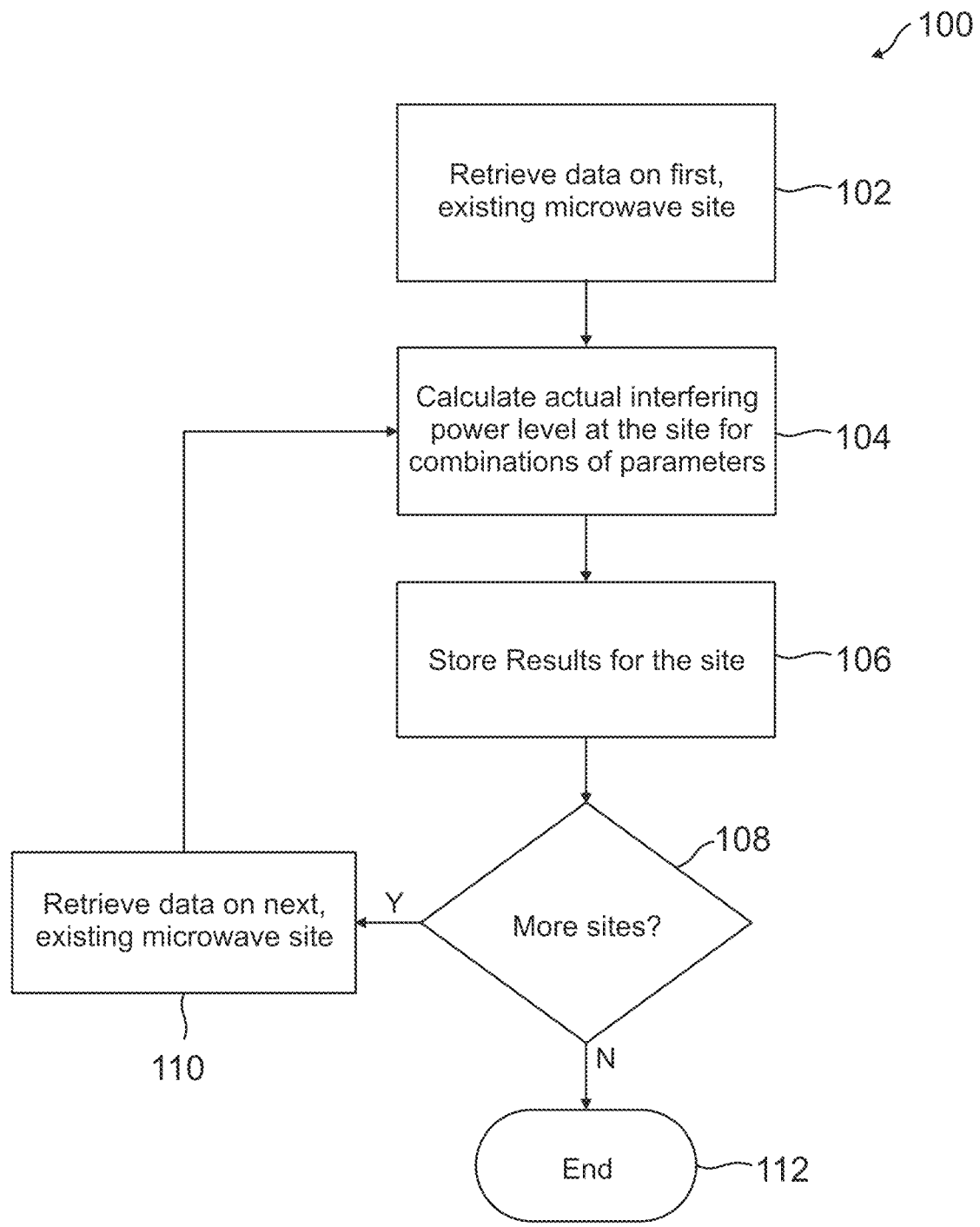
FIG. 1 is a flow chart that illustrates one embodiment of a process for generating a site-based interfering power level database that can be used in frequency planning for new microwave systems

In the following detailed description, reference is made to the accompanying drawings that form a part hereof, and in which is shown by way of specific illustrative embodiments in which the invention may be practiced. These embodiments are described in sufficient detail to enable those skilled in the art to practice the invention, and it is to be understood that other embodiments may be used, and that logical, mechanical and electrical changes may be made without departing from the scope of the present invention. The following detailed description is, therefore, not to be taken in a limiting sense.

I. Overview

Embodiments of the present invention provide a system and method for frequency planning for a microwave system. Embodiments of the present invention give a user instantaneous evaluation of the microwave spectrum across a given geographic area in one or multiple frequency band/bandwidths. The instantaneous evaluation is enabled by pre-calculation of interference potential across the geographic area for the most commonly used frequency band/bandwidth scenarios and storing those results in a database. Then, when a new microwave system is under consideration, the results are selectively retrieved from the database and presented to a frequency planner graphically on a display in a way that enables the frequency planner to see where bandwidth is available for the new microwave system. In other words, embodiments of the present invention provide an improvement in network planning technology by enabling users such as microwave design engineers, network planners and individuals responsible for site acquisition to perform network planning more efficiently. Embodiments of the invention provide a comprehensive view into the spectrum landscape which enables users to more rapidly identify spectrum availability and site location and other configuration options.

Other uses of the embodiments of the present invention enable structure owners (building, tower, tank, silo etc.) to generate 0-360-degree site spectral reports to provide to prospective customers. Further, embodiments of the present invention also enable microwave vendors to perform pre-sales for customers assuring them that spectral expansion is available.

In a traditional microwave interference analysis, you evaluate paths one at a time and calculations are performed as you progress. The final result determining whether or not a frequency is available is a culmination of evaluating the interfering power levels from existing paths within a geographic cull. If there is no predicted interference on a given frequency from a new proposed path with respect to all of the environmental incumbents, then the frequency is considered to be clear. In contrast, embodiments of the present invention pre-calculate interference based on a geographic area, rather than site/path based. Further, embodiments of the present invention calculate multiple permutations of sites, azimuths, bands, and bandwidths, and store the results for instantaneous access when needed. To do this sort of analysis, a significant amount of pre-analytics need to be performed and stored before even a single real-time analysis can be conducted. This initial analysis and geographic compilation of results requires significant processing time and storage. However, once compiled, spectrum availability solutions may be indexed and retrieved when a new microwave system is being planned.

Due to the time intensive nature of the initial calculations, it is advantageous to streamline the interference analysis engine. For example, the analysis may be streamlined by recognizing and eliminating duplicated calculations. An example of a duplicated calculation would be finding the total terrain loss between two points on a map at a given height and frequency band for one azimuth and then storing that result for all azimuths instead of repeating the calculation for each azimuth angle.

II Generating the Frequency Planning Database

FIG. 1 is a flow chart that illustrates one embodiment of a process, indicated generally at 100, for generating a database that can be used in frequency planning for new microwave systems. Process 100 uses data on existing microwave sites to create this database. Process 100 uses that data to determine actual interfering power levels in a geographic region based on several factors as explained in more detail below.

Figure 2:
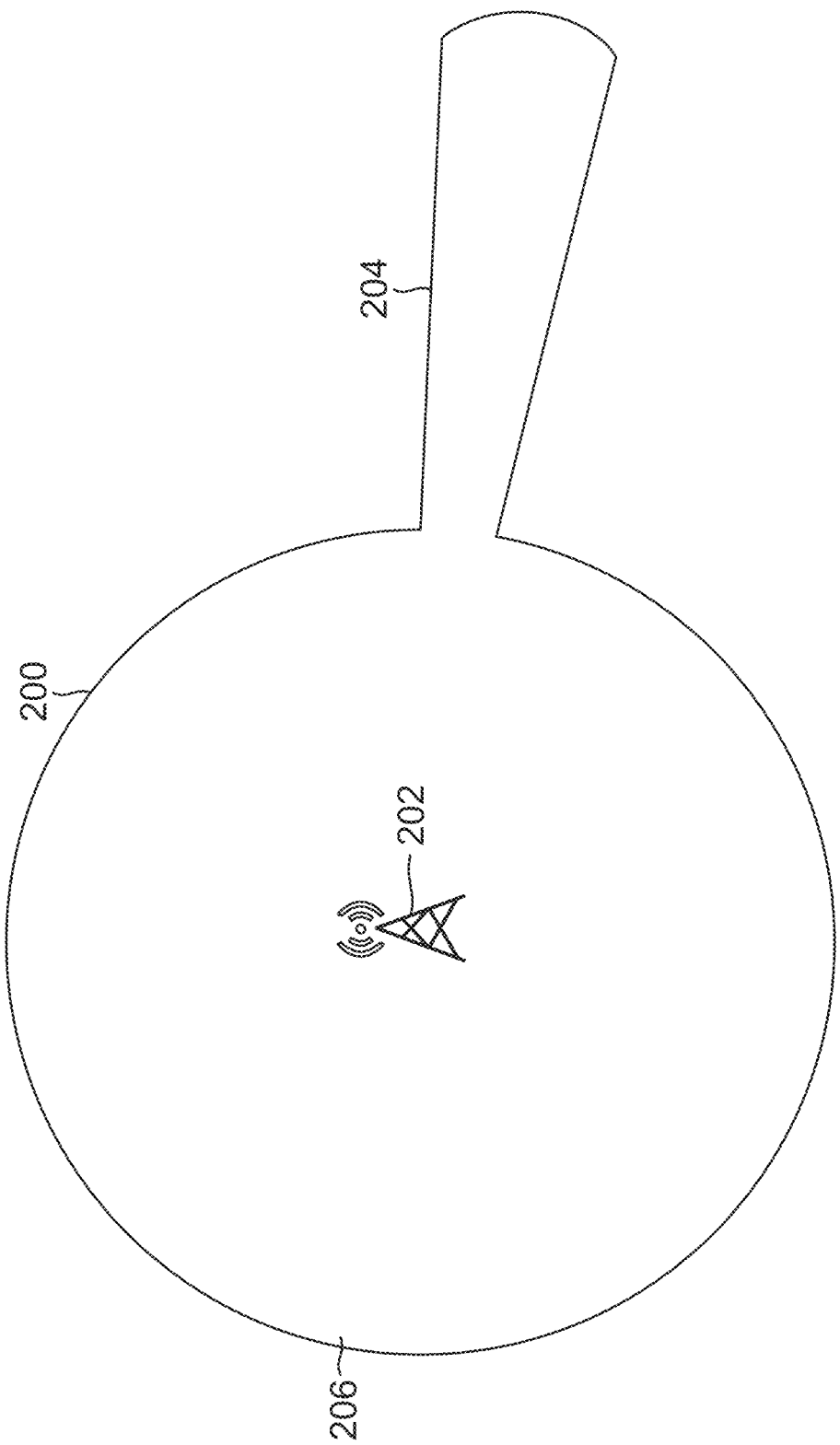
FIG. 2 is a schematic diagram that illustrates the geographic area that is considered when determining potential interference for a microwave system.

As an initial matter, microwave signals only propagate a certain geographic distance where the interfering signal levels are strong enough to be of concern. For example, FIG. 2 depicts the geographic area, 200, around a microwave site 202 that may have signal levels strong enough to interfere with other microwave systems. The basic shape of geographic area 200 is commonly referred to as a "keyhole" shape with region 204 protruding from generally circular region 206 centered on microwave site 202. Region 204 extends generally in the direction of the signal path for microwave site 202. In this example, microwave site 202 operates in the 6.1 GHz microwave band. In this band, the industry recommends that frequency planning analyze a "keyhole distance" up to 250 miles in the keyhole direction (region 204) and 125 miles in other directions (circular region 206) around each site 202 as illustrated in FIG. 2.

Figure 3:
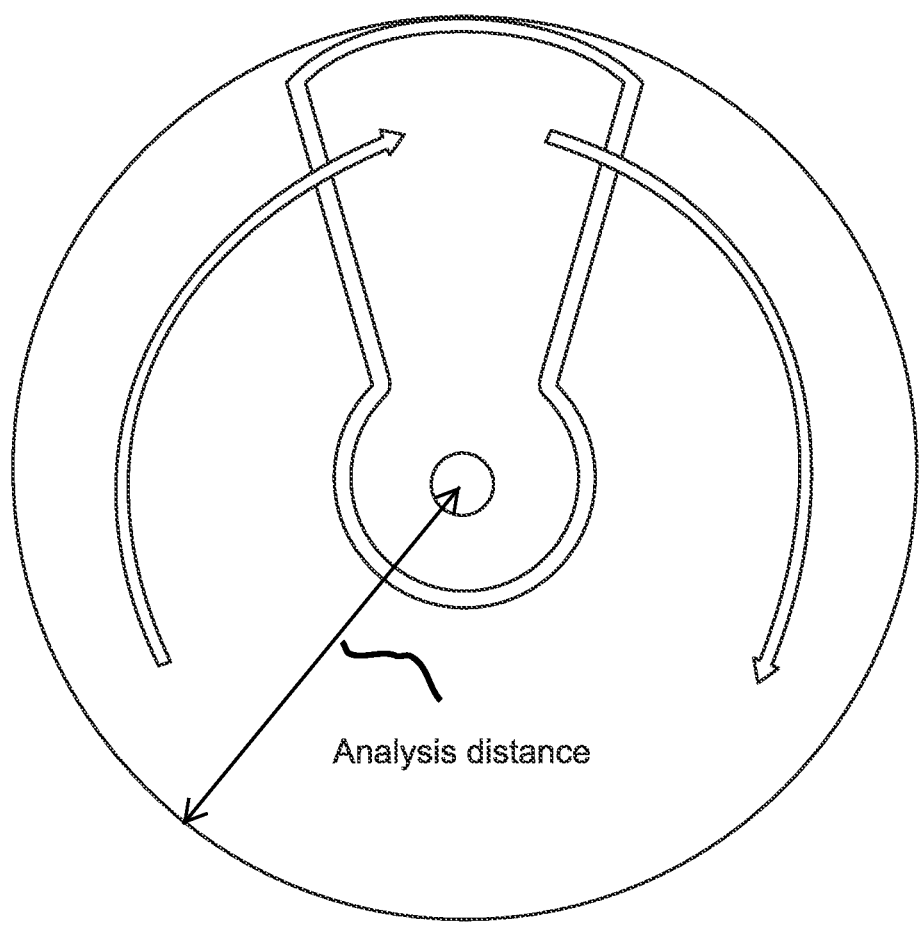
FIG. 3 is a schematic diagram that illustrates a revised geographic area that is considered when calculating interference for a microwave site according to one embodiment of the present invention.

An overview of how the pre-analysis is done is described below:

Site based interference analysis will be stored for the entire 0-360 degrees at the appropriate keyhole distance with 0.1 degree granularity. (See FIG. 3)

All existing microwave sites within the database will be evaluated using industry accepted interference criteria.

Another embodiment may consider storing this data for all points on a map grid instead of just discrete existing sites, but the storage and time to pre-calculate scales up very significantly depending on the grid resolution (see FIG. 8 discussed in more detail below).

In one embodiment, process 100 would be run with the most commonly used frequency bands and bandwidths.

In one embodiment, only five to ten unique height attributes for the antenna are used to simulate terrain loss between two points. In other embodiments, further granularity is used.

When the database is accessed by a user, microwave radio, antenna series and radio transmit power level are provided by the user so these parameters can be properly incorporated into the final result.

As explained in more detail below with respect to FIG. 9, the database is dynamic. As new sites are formerly registered into the active database, any existing sites within industry accepted cull distances will have their interference level criteria updated accordingly.

Process 100 of FIG. 1 begins at block 102 by receiving data on the first of the existing microwave sites to be included in the database. At block 104, process 100 calculates the actual interfering power level at the microwave site. In one embodiment, this actual interfering power level is separately computed for all combinations of several parameters. The actual interfering power level can also be viewed as a measure of the spectral availability. Process 100 stores this result in the database at block 106. This result for a given frequency band both into and out of a site is stored in accordance to a given:

Bandwidth (all common bandwidths)
Frequency (all applicable frequencies)
Polarization (vertical and horizontal)
Antenna height above ground level (see below)
Azimuth (see below)

An integral part to any interference calculation is the inclusion of losses. This analysis accounts for many or all of the following losses:

Cabling
Connectors
Free Space Path Loss (FSPL)
Atmospheric Absorption
Terrain
Buildings
Various ground clutter To ensure the highest reasonable level of accuracy in calculated actual interfering power level, the angular resolution of the calculations should be to one tenth of one angular degree and also utilize three dimensional relationships between the interfering and victim antennas. Interference results for various antenna heights will be stored. In one embodiment, a granularity of 50 foot increments between 50 and 350 feet is used because it covers most interference scenarios. In other embodiments, a finer granularity is used when needed to cover other interference scenarios.

At block 108, process 100 determines whether there are additional existing sites that have not yet been processed to determine the actual interfering power level. If there is at least one site that has not been analyzed, process 100 continues to block 110 and retrieves data relating to a next, existing microwave site. Process 100 then returns to block 104 to calculate and store the actual interfering power level for that site. If, however, all existing sites have been analyzed, the process ends at block 112.

III. Using the Frequency Planning Database: Visual Representation of Available Frequency Spectrum As discussed above, one of the advantages of the embodiments of the present invention is that the frequency planning database can be used to provide a visual representation of the available frequency spectrum in a geographic region. This visual representation enables a frequency planner to simultaneously consider various options for the location of a new microwave site with minimal real-time processing. Thus, this represents an improvement to the state of the art of frequency planning for microwave systems. For pedagogical purposes, a number of examples are described below for ways in which the frequency planning database can be used to improve frequency planning for microwave systems.

Figure 4:
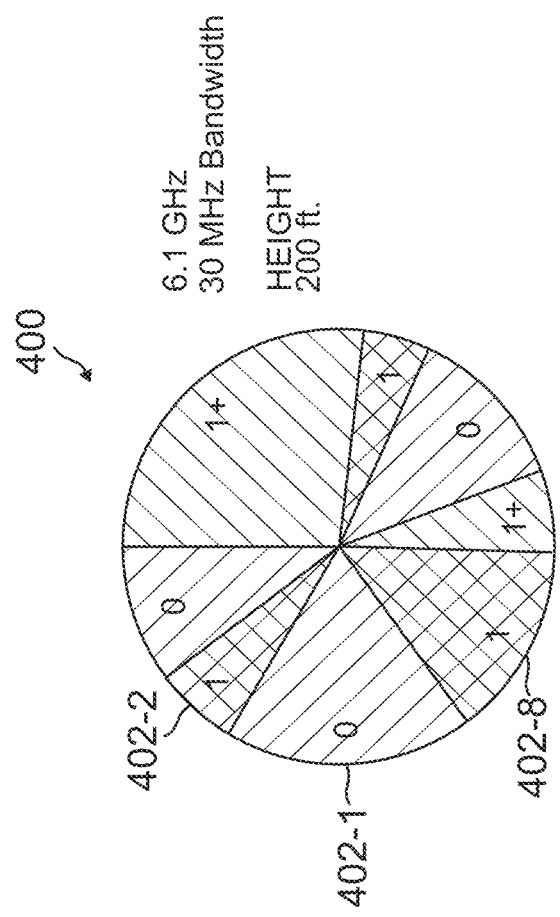
FIG. 4 is a schematic diagram that provides a visual representation of the availability of microwave spectrum at a selected site by azimuth according to one embodiment of the present invention.

A first illustrative example is shown in FIG. 4. In this example, the visual representation of the data comprises a circle that uses the data from the frequency planning database to show the number of available frequencies for a donor (new) microwave site (using an existing site) with respect to azimuth and height in a given frequency band. The donor (new) site is represented by circle 400. Each wedge 402-1-402-8 in circle 400 is color coded to indicate whether a microwave site could be supported at any Azimuth angle within the arc of the wedge in the 6.1 GHz band with a bandwidth of 30 MHz at a height of 200 feet. The wedges 402 are color coded to make it easier to identify which potential links would work for the planned microwave system. In this embodiment, wedges 402 that are colored in shades of green have available bandwidth. Light green indicates that one 30 MHz frequency band is available within the 6.1 GHz band. Further, dark green wedges indicate that more than one 30 MHz frequency band is available in the 6.1 GHz band. Further, as discussed above, the frequency planning database includes data for Azimuth angles in increments of 0.1 degrees. As illustrated in this example, contiguous Azimuth angles with the same result (same number of available channels (0, 1, or 1+) are combined to form the illustrated wedges 402.

Figure 5:
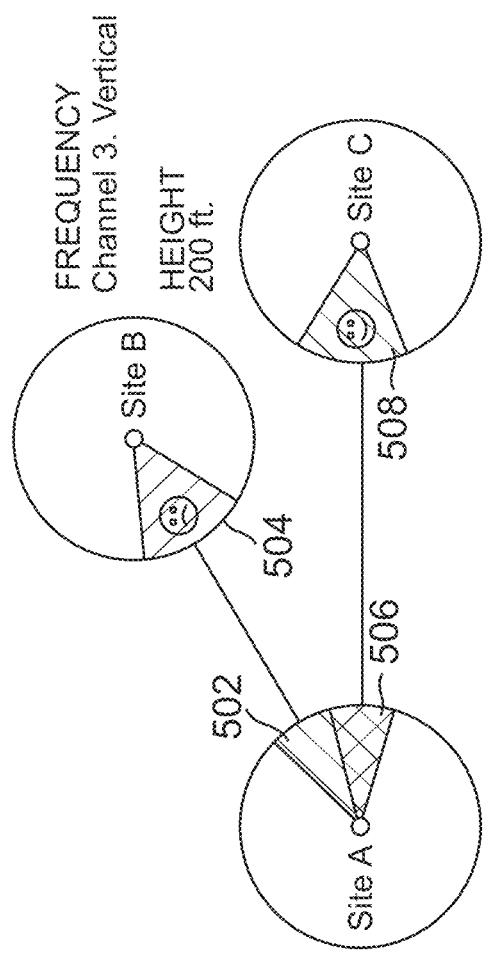
FIG. 5 is a schematic diagram that provides a more detailed visual representation by azimuth of the availability of microwave spectrum at a selected site according to another embodiment of the present invention.

FIG. 5 illustrates another example of using the data from the frequency planning database to provide a visual representation of a proposed (donor) microwave site. In this example, three sites are illustrated; namely sites A, B, and C. Site A—the donor site—is the new proposed site that is being evaluated for spectrum availability. Sites B and C are existing incumbent sites and are known as recipient sites. Recipient sites play a direct role in the spectrum availability for Site A—the donor site.

The green colors in wedges 502 and 506 at donor Site A symbolize no potential interference looking at the recipient sites B and C respectively. However; recipient Site B looking back at Site A does have predicted interference (shown in orange in wedge 504). Recipient Site C looking back at Site A does not have predicted interference (shown in green in wedge 508). The final result of donor Site A is an AND function of its result on a given azimuth mated up with the recipient site. In this example, after the AND function has taken place, Site A will have predicted interference with Site B, but will not have predicted interference with Site C.

Figure 6:
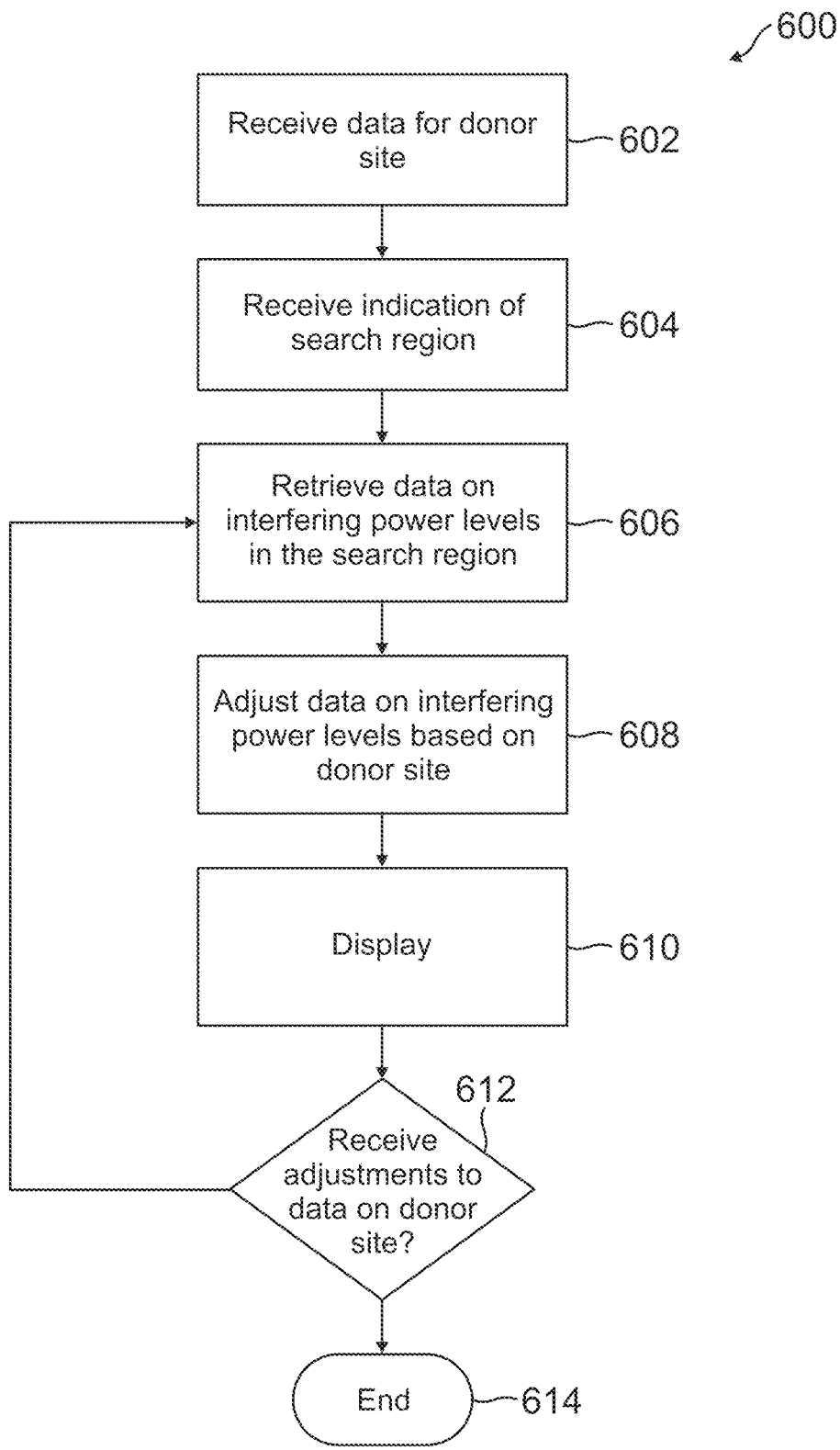
FIG. 6 is a flow chart that illustrates one embodiment of a process for using a frequency planning tool to provide a visual representation of the availability of microwave spectrum in a geographic area for a proposed microwave system.
Figure 8:
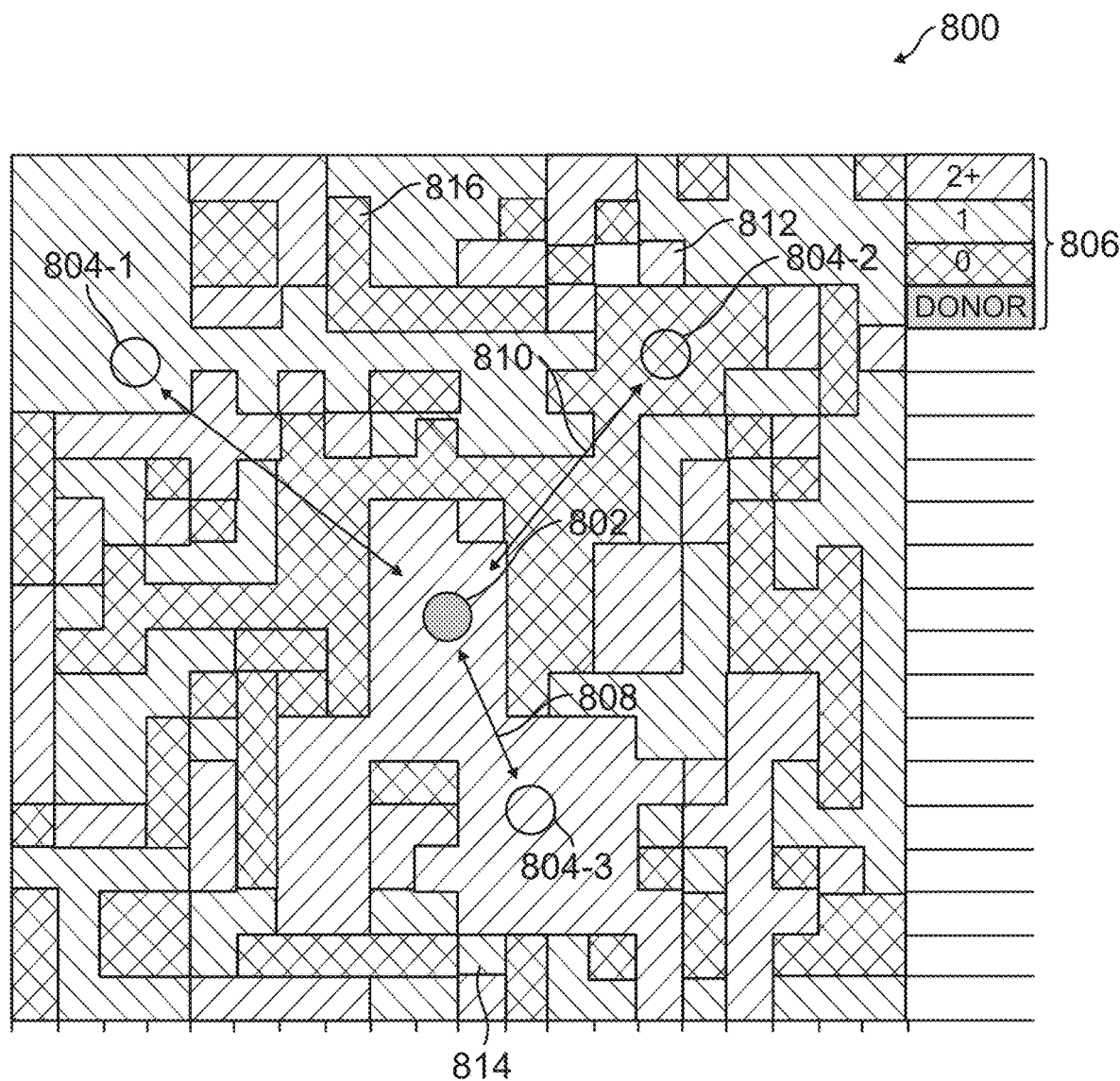
FIG. 8 is a schematic diagram of one embodiment of a visual representation of the availability of microwave spectrum in a geographic region.

FIGS. 6, 7, and 8 illustrate another embodiment of a technique for frequency planning using the frequency planning database such as a frequency planning database constructed according to the teachings of the embodiment of FIG. 1 described above, but this time with respect to multiple points within a geographic region and not limited to the existing site locations. FIG. 6 illustrates a process, indicated generally at 600, for using the frequency planning database to generate a visual display of the available microwave spectrum for a potential donor (new) microwave site. Process 600 begins at blocks 602 and 604 by receiving data on the donor site and an indication of the proposed search region, respectively. This includes information on equipment parameters for the donor site. In one embodiment, this data is gathered using a user interface such as the example embodiment of a user interface indicated generally at 700 in FIG. 7.

The interface 700 of FIG. 7 captures information for the donor site in several sections of the user interface. In one embodiment, interface 700 also captures information on a proposed recipient site. Regarding the donor site, interface 700 captures information on the selected microwave band in section 702. For example, the user may specify the band and the bandwidth of the donor site in Fields 704. In this example, the 6.1 GHz band, with channels having 30 MHz bandwidth are chosen. The fields 704, in one embodiment, comprise dropdown menus that include a list of the possible values for the user to select for each of fields 704.

Interface 700 also include a section 706 that captures information regarding the donor site. Specifically, fields 708, 710, and 712 provide three options for identifying the location of the proposed donor site. First, field 708 can be used to directly enter the latitude and longitude of the donor site. Alternatively, the location of the donor site can be entered in field 710 by entering the call sign for the site from, for example, the Federal Communications Commission (FCC). Finally, the location of the donor site can be entered by using the Antenna Structure Registration from the FCC. As discussed in more detail below with respect to FIG. 8, another embodiment allows the user to simply click on one site (donor) on a map to see nearby results (recipients) within a user designated search radius constraint.

Additionally, fields 714 enable a user to identify the antenna and radio equipment for the donor site. Further, in some embodiments, interface 700 includes a section, 716, for entering similar data for the planned recipient site; although this information is optional for the frequency planner.

Finally, interface 700 includes section 718 for receiving information on the geographic region of the search in fields 720. For example, fields 720 gather information such as whether line of site is required. When selected, process 600 of FIG. 6 will only consider recipient sites if they are "line of sight" with the donor as microwave communications are primarily a line of sight form of wireless telecommunication. Fields 720 also specify the maximum and minimum radius of the search region. Finally, additional enhancements to this system (not shown) could allow the user to select technology specific (TDD vs FDD) forms of communications. Section 718 of interface 700 also includes a submit button 722 that enables the user to submit the entered information to the frequency planning system, such as system 1000 of FIG. 10 described in more detail below.

Returning to the description of FIG. 6, once the data on the donor site and the search region is received, process 600 moves to block 606 and retrieves data from the frequency planning database on interfering power levels for sites in the search region. Process 600 adjusts the data on interfering power levels based on the data on the donor site received at blocks 602 and 604, e.g., donor and recipient site antenna discrimination and donor and recipient radio receiver filtering.

Process 600 proceeds to block 610 and displays a visual representation or map of the microwave spectrum within the search radius on a display for the frequency planner. One embodiment of this visual representation or map is shown in FIG. 8. In this embodiment, the visual representation or map 800 of the microwave spectrum is shown as a grid of possible site locations laid out on a geographic land mass. In this embodiment, the geographic area represented by the visual presentation or map is broken up into geometric areas (in this example squares although other appropriate shapes can be used in other embodiments.) The grid shows the availability of microwave spectrum (frequency spectrum or channels) for three sites 804-1 to 804-N relative to a donor (proposed site) 802. In this embodiment, the availability of frequency spectrum is also shown for the land mass between the sites (e.g., other possible locations for the donor site). The donor site 802 is selected either by clicking on the map 800 or by entering the location in the interface of FIG. 7 as described above.

The visual representation or map 800 of the microwave spectrum in FIG. 8 also includes a key 806 that indicates the meaning of the color code used in the presentation of the data. In this case, the dark green color (e.g., recipient site 804-3 and block 812) is used for sites and land mass that have 2 or more frequency channels that are available for communication with the donor site 802. Similarly, the key 806 indicates that light green (e.g., recipient site 804-1 and block 814) is used to indicate that one frequency channel is available and orange (e.g., recipient site 804-2 and block 816) indicates that no channels are available. These colors are used with respect to the sites 804-1 to 804-3 as well as the landmass.

For visual inspection, it can be seen that donor site 802 can communicate with recipient site 804-3 as recipient site 804-3 is colored dark green. In contrast, by visual inspection, it can be seen that path 810 between donor site 802 and recipient node 804-2 is not available as there are no frequencies available at recipient node 804-2 as represented by recipient node 804-2 being colored orange. Recipient site 804-1 is colored light green indicating that one frequency channel is available for communication with donor site 802.

Once the data is displayed at block 610, the user may change, at block 612, the data entered at blocks 602 and 604 based on the visual representation of the microwave spectrum displayed at block 610. The enables the user to quickly move through various options in designing the new microwave system. These changes can be entered by returning to the interface of FIG. 7 and updating the entries. Further, in some embodiments, graphical representation 800 if FIG. 8 may be used to change the data that describes the proposed new microwave system. In one example, the location of the donor site may be modified by clicking on a different location in the geographic region represented in visual representation 800. If the data is modified, process 600 returns to block 606 to prepare to display the updated microwave spectrum information based on the new data. If no changes are made, process 600 ends at block 614.

IV. Maintaining the Frequency Planning Database

Pre-calculated results are not static and will change over time when new microwave paths are inserted into the registered database of microwave links. New paths added into the database will cause a refactoring of interfering power levels for all sites within a certain distance cull. The entire database of results does not need to be refactored because microwave signals only propagate a certain geographic distance where the interfering signal levels are strong enough to be of concern.

For example, as discussed above with respect to FIG. 2, in the 6.1 GHz microwave band the industry recommended maximum analysis distance is 250 miles in the keyhole directions and 125 miles in other directions around each site. Therefore, the refactoring of the results for a new path insert at 6.1 GHz would only involve sites within 250 miles around each insert and not the entire database. These small updates are not likely to be time intensive.

Figure 9:
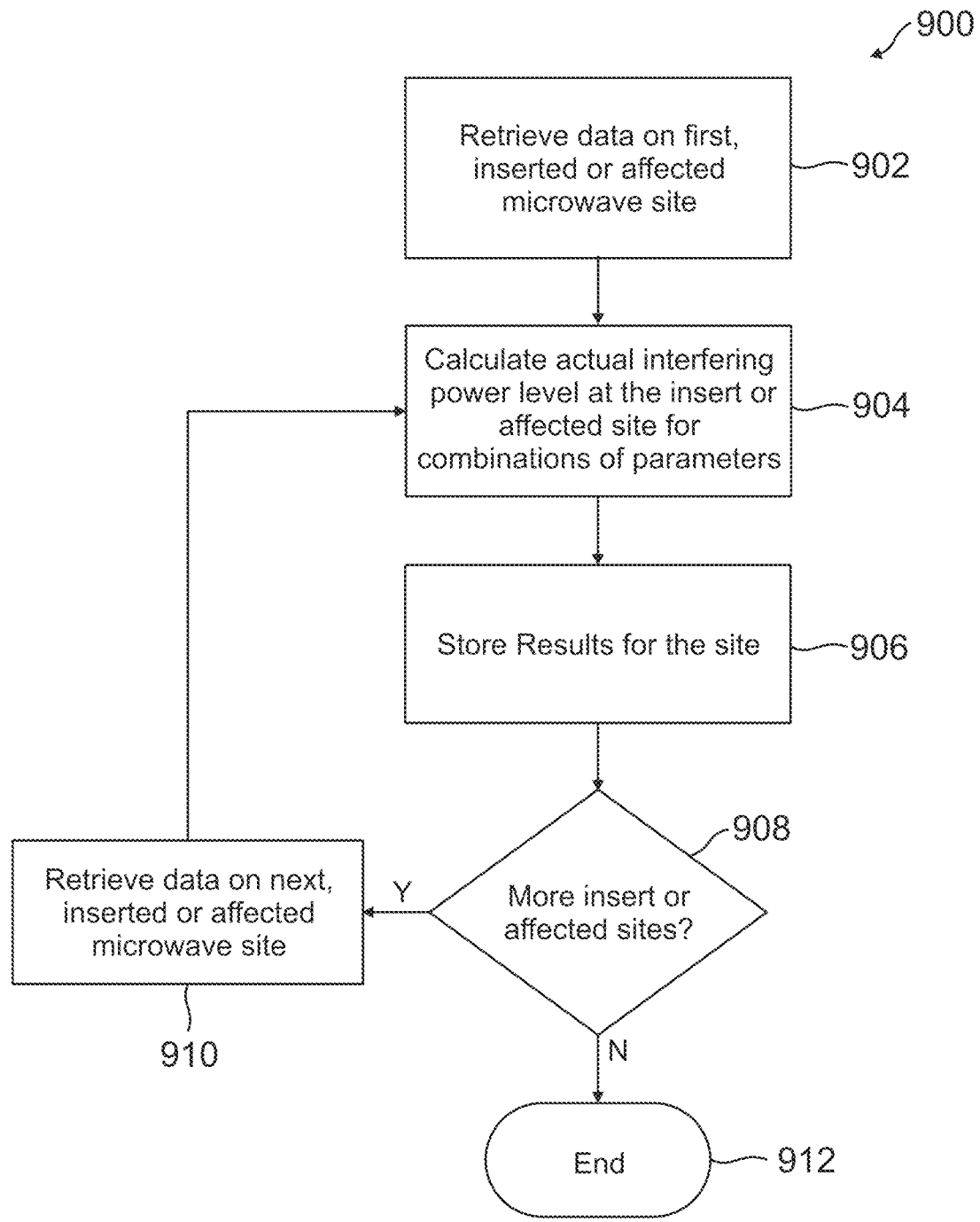
FIG. 9 is a flow chart of one embodiment of a process for updating a frequency planning database when new microwave sites are activated or existing microwave sites are decommissioned.

FIG. 9 is a flow chart of a process, indicated generally at 900, for updating the frequency planning database to account for new microwave sites that have been brought on-line and existing microwave sites that have been decommissioned. Process 900 begins at block 902 by receiving data on the first insert or affected microwave sites to be included or updated in the database. At block 904, process 100 calculates the actual interfering power level at the microwave site in the same manner as described above with respect to the calculations at block 104 of FIG. 1.

At block 908, process 900 determines whether there are additional inserted or affected sites that have not yet been processed to determine the actual interfering power level. If there is at least one site that has not been analyzed, process 900 continues to block 910 and retrieves data relating to a next, inserted or affected microwave site. Process 900 then returns to block 904 to calculate and store the actual interfering power level for that site. If, however, all inserted or affected sites have been analyzed, the process ends at block 912.

V. Frequency Planning System

Figure 10:
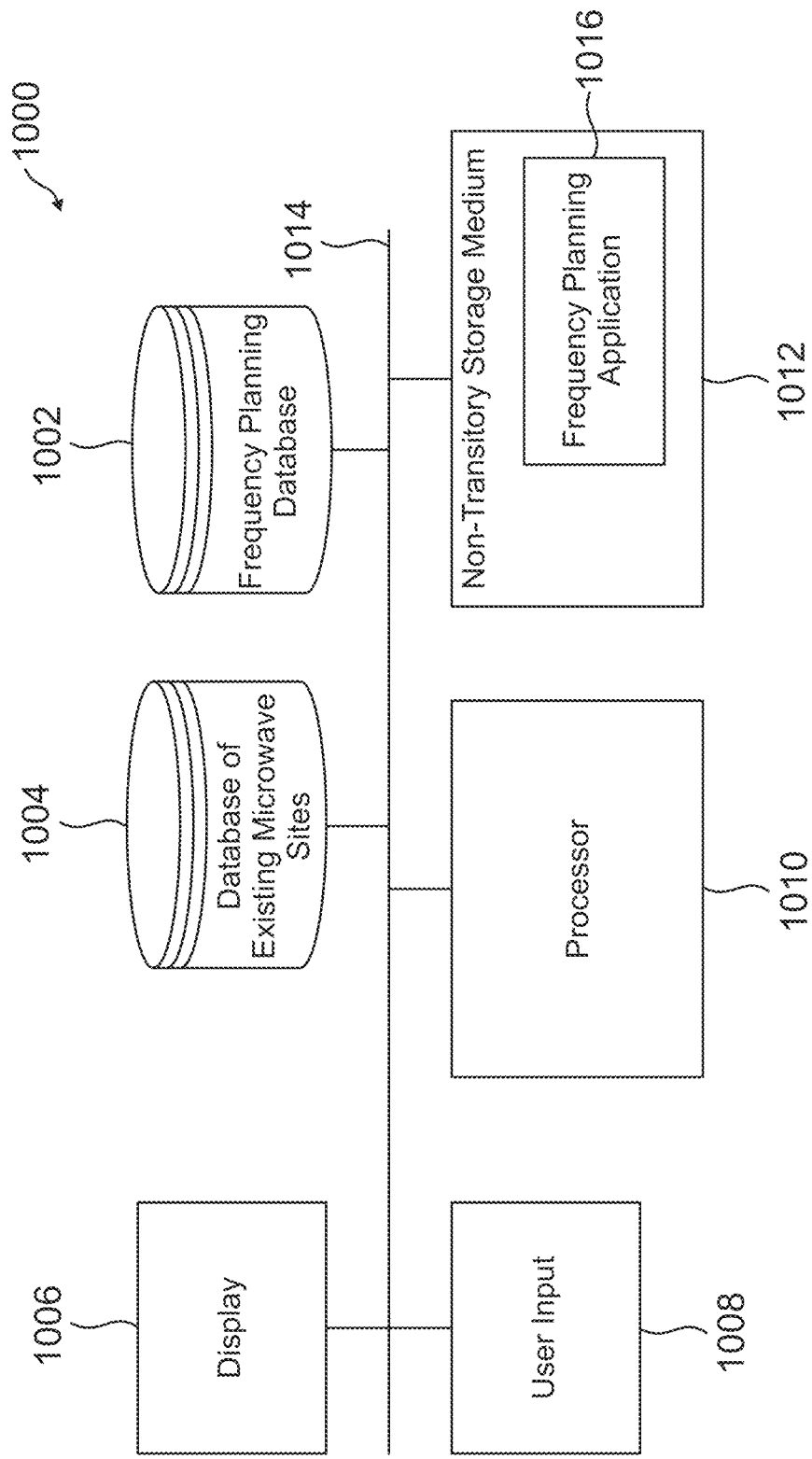
FIG. 10 is a block diagram of one embodiment of a system for frequency planning of microwave systems according to the teachings of the present invention.

FIG. 10 is a block diagram of a system indicated generally at 1000 for use in frequency planning for a microwave system. System 1000 includes a display 1006 for displaying information to a user. Further, system 1000 also includes user input 1008. In one embodiment, user input 1008 includes any conventional form of human machine interface, e.g., keyboard, mouse, joystick, touchscreen, microphone, or the like. System 100 also includes a frequency planning application 1016 that is stored on a non-transitory storage medium 1012 and run on a processor 1010 using a database 1002 to present data to a user on display 1006. The frequency planning application 1016 uses the process 600 of FIG. 6, for example, to provide the user with a graphical representation of the microwave spectrum in a geographic area around a proposed microwave system so that the user can select a location for the microwave system. In one embodiment, data is gathered from the user using display 1006 and user input 1008 and interface 700 of FIG. 7. Further, in one embodiment, results are displayed to the user on display 1006 in, for example, the format shown in either FIGS. 4, 5, 8 or other appropriate format so that the user can determine where to locate the proposed microwave system.

In other embodiments, frequency planning application 1016 of system 1000 includes code to implement the processes 100 and 900 of FIGS. 1 and 9, respectively, to generate and update, respectively, frequency planning database 1002 from the data in database 1004 of existing microwave sites. In one embodiment, frequency planning database 1002 and database 1004 are implemented as a single database while in other embodiments, databases 1002 and 1004 are maintained as separate databases.

VI. Using a Frequency Planning System: Configuration of a Network Device

In the embodiments described above, a frequency planning system and database are used to provide a graphical representation of the availability of the spectrum landscape based on site specific interference data. In this embodiment, the output of the frequency planning system is used to automatically configure network equipment to be used in a proposed communication system, e.g., microwave system, based on the results from the frequency planning system. This is accomplished through machine-to-machine communication of data rather than the generation of a graphical representation of the available spectrum. In other words, embodiments of the frequency planning system receive data from the device or devices to be configured, use the data to identify available spectrum and communicates the results, e.g., the assigned frequency spectrum, to the device or devices of the proposed communication system. The device or devices are then enabled to operate in the proposed communication system. This embodiment is described in conjunction with FIGS. 11, 12, and 13 below.

Figure 11:
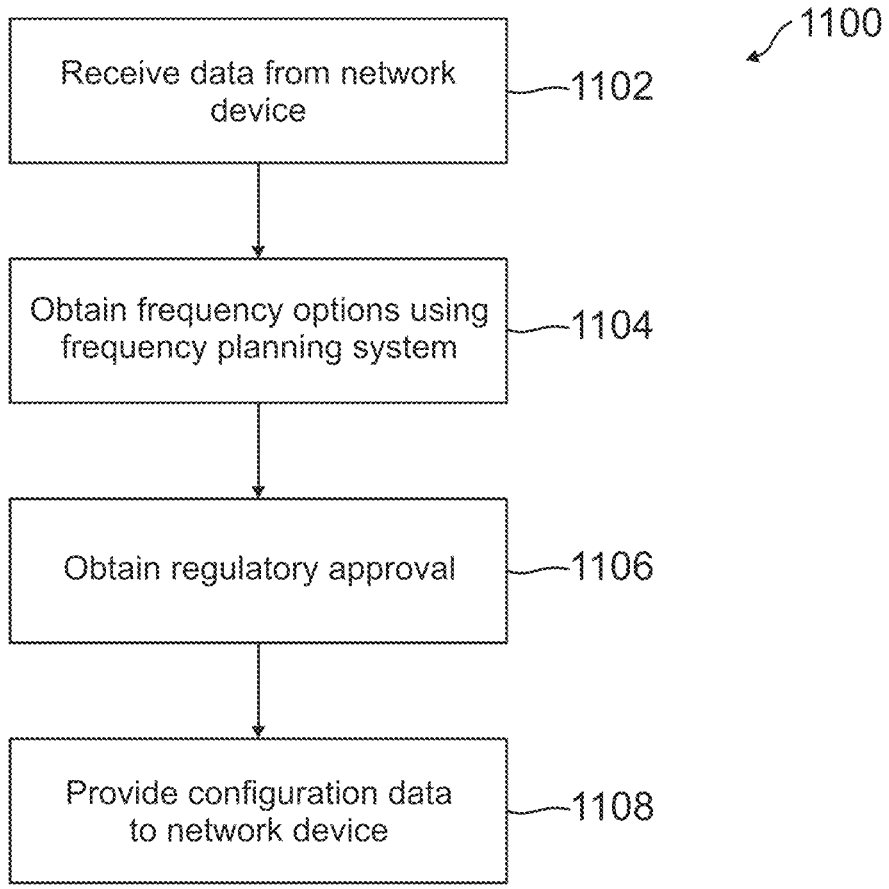
FIG. 11 is a flow chart of an embodiment of a process for generating configuration data for a network device using a frequency planning system.

FIG. 11 is a flow chart of an embodiment of a process, indicated generally at 1100, for generating configuration data for one or more network devices 1302-1 and 1302-2 of a proposed communication system 1301 using a frequency planning system 1312. FIG. 11 illustrates a process from the perspective of the frequency planning system 1312. In one embodiment, the frequency planning system 1312 is built on the technology described above with respect to FIGS. 1-10. However, in this embodiment, the frequency planning system 1312 produces data that is used by first and second network devices 1302-1 and 1302-2 to configure these devices to communicate over a selected communication channel 1306. In one embodiment, communication system 1301 is a proposed microwave communication system and network devices 1302-1 and 1302-2 comprise microwave radios that are each coupled to a respective microwave antenna.

At block 1102, process 1100 receives data from a network device, such as network devices 1302-1 and 1302-2. In one embodiment, this information includes: bandwidth, frequency, polarization, antenna height, Azimuth angle, antenna and radio model, and the proposed location of the first and second communication devices 1302-1 and 1302-2. In other embodiments, other appropriate data is provided. The data is communicated from first and second network devices 1302-1 and 1302-2 through communication modules 1304-1 and 1304-2, respectively. These communication modules 1304-1 and 1304-2 are configured to communicate with the frequency planning system 1312 over any appropriate data network 1310, e.g., the Internet, a cellular data network, wireless broadband wide area network or the like.

Process 1100 uses the data from the network devices 1302-1 and 1302-2 to generate configuration data for the network devices 1302-1 and 1302-2. At block 1104, process 1100 obtains one or more options for the operating frequency and bandwidth from frequency planning system 1312. These options are generated, for example, as described above with respect to FIG. 6. At block 1106, process 1100 sends the selected frequency options to a regulatory system 1314 to obtain approval of the selected frequency options, e.g., an automated system of the Federal Communication Commission (FCC) or other agency that controls licensing of frequency spectrum. At block 1108, process 1100 provides the appropriate configuration data to the first and second network devices 1302-1 and 1302-2 as approved by the regulatory agency. At this point, the first and second devices 1302-1 and 1302-2 are ready to operate over communication channel 1306 of communication system 1301.

Figure 12:
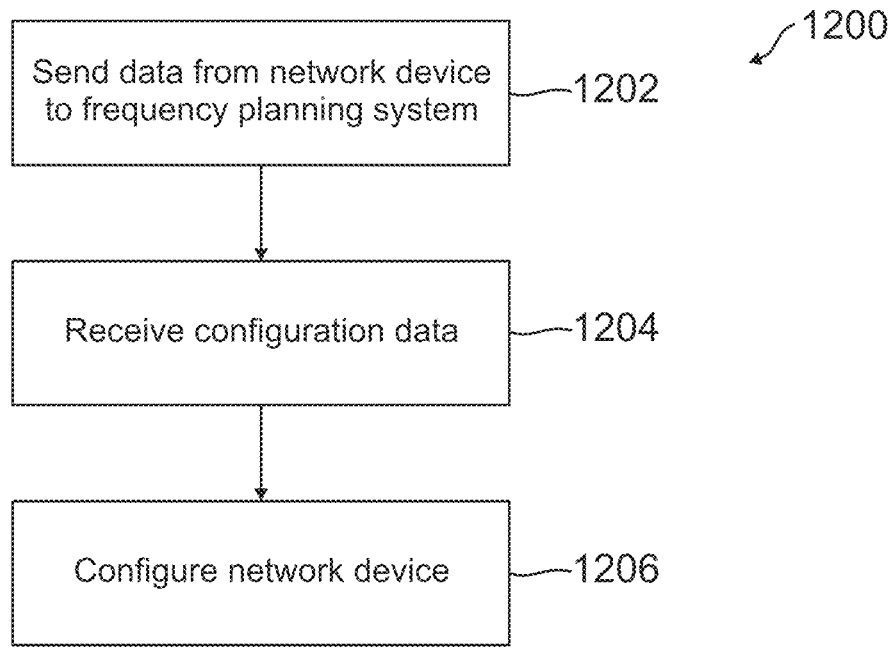
FIG. 12 is a flow chart of an embodiment of a process for configuring a network device using data from a frequency planning system.
Figure 13:
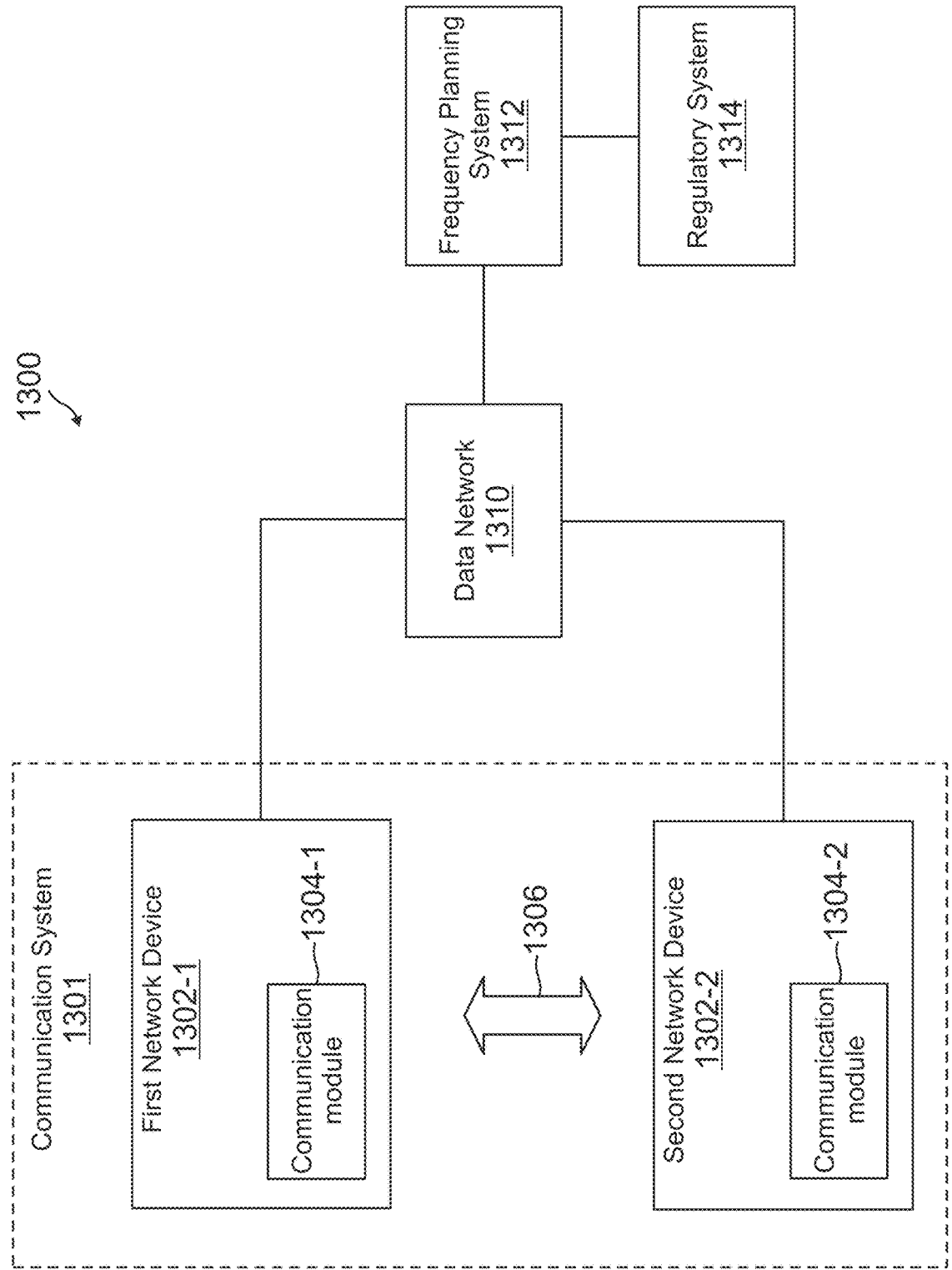
FIG. 13 is a block diagram of one example of a system for configuring a network device according to the teachings of the present invention.

FIG. 12 is a flow chart of an embodiment of a process, indicated at 1200, described from the perspective of the network device, e.g., network device 1302-1 for configuring the network device using data from a frequency planning system 1312. This process works in conjunction with process 1100 of FIG. 11. In FIG. 12, process 1200 begins by sending data from network device 1302-1 to frequency planning system 1312 over data network 1310 at block 1202. This is the data that is received by process 1100 at block 1102, for example. In one embodiment, this data includes: one or more of a proposed location, height, frequency, bandwidth, Azimuth, and model numbers for an antenna and a radio for a proposed microwave system. In one embodiment, the data is sent by the network device, e.g. a radio. At block 1204, process 1200 receives the configuration data from the frequency planning system. This is the configuration data that is provide to the network device at block 1108 of FIG. 11. Once the data is obtained, the network device 1302-1 is configured for operation at block 1206.

Functionality described here as being implemented in a software application (e.g., frequency planning application 1016 of FIG. 10) can be implemented in other ways (for example, using an application specific integrated circuit (ASIC) or field programmable gate array (FPGA)).

The methods and techniques described here may be implemented in digital electronic circuitry, or with a programmable processor (for example, a special-purpose processor or a general-purpose processor such as a computer) firmware, software, or in combinations of them. Apparatus embodying these techniques may include appropriate input and output devices, a programmable processor, and a storage medium tangibly embodying program instructions for execution by the programmable processor, for example system 1000 of FIG. 10. A process embodying these techniques may be performed by a programmable processor executing a program of instructions to perform desired functions by operating on input data and generating appropriate output. The techniques may advantageously be implemented in one or more programs that are executable on a programmable system including at least one programmable processor coupled to receive data and instructions from, and to transmit data and instructions to, a data storage system, at least one input device, and at least one output device. Generally, a processor will receive instructions and data from a read-only memory and/or a random access memory. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and DVD disks. Any of the foregoing may be supplemented by, or incorporated in, specially-designed application-specific integrated circuits (ASICs) or Field Programmable Gate Arrays (FGPAs).

EXAMPLE EMBODIMENTS

Example 1 includes a method for frequency planning of a proposed microwave system, the method comprising: receiving data regarding the proposed microwave system; retrieving site-specific interference data from a database for a region around the proposed microwave system; presenting a graphical representation of frequency availability based on the received data and the retrieved data; and when a user input is received, providing additional details on potential interference levels.

Example 2 includes the method of example 1, wherein receiving data regarding the proposed microwave system comprises receiving: a location of the proposed microwave system as one of latitude and longitude, an FCC call sign, or an FCC ASR; an antenna model and centerline (FT); a radio model; and a transmit power.

Example 3 includes the method of example 2, wherein receiving data regarding the proposed microwave system further comprises receiving an indication of a search region for the proposed microwave system.

Example 4 includes the method of any of examples 1-3, wherein presenting a graphical representation of frequency availability comprises color coding regions on a display based on the availability of frequency channels in a corresponding geographic region.

Example 5 includes the method of any of examples 1-4, and further comprising determining the frequency availability on a site-by-site basis based in part on the site-specific interference data.

Example 6 includes the method of any of examples 1-5, and further adjusting the retrieved site-specific interference data based on the received data regarding the proposed microwave system.

Example 7 includes a method for generating a database for a system that provides a graphical representation of available frequency spectrum, the method comprising: retrieving data from one or more databases on existing wireless communication systems; for each existing wireless communication system, calculating the actual interfering power level at a site of the wireless communication system for selected combinations of communication parameters; and storing the results for each existing site of the communication system.

Example 8 includes the method of example 7, wherein retrieving data from one or more databases comprises retrieving data from one or more databases on existing microwave sites in microwave communication systems.

Example 9 includes the method of any of examples 7-8, wherein calculating the actual interfering power level comprises calculating the actual interfering power level at each site of the wireless communication system for selected combinations of communication parameters including bandwidth, frequency, polarization, selected antenna heights above ground level, discrete increments of azimuth angles, and incumbent antenna discrimination.

Example 10 includes the method of any of examples 7-9, wherein calculating the actual interference comprises calculating, for each Azimuth angle between 0 and 360 in increments of 0.1 degree and at height intervals of 50 feet from zero to 350 feet, the actual interfering power level for all combinations of bandwidth, frequency, polarization and incumbent antenna discrimination.

Example 11 includes a method for augmenting a database for a system that provides a graphical representation of microwave spectrum, the method comprising retrieving data from databases on microwave sites that have been deployed since the database was last updated ("new microwave sites") and existing microwave sites that are affected by the new microwave sites; for each new and existing microwave site, calculating the actual interfering power level at the site for selected combinations of bandwidth, frequency, polarization, selected antenna heights above ground level, discrete increments of azimuth angles, and incumbent antenna discrimination; and storing the results for each new and existing microwave site.

Example 12 includes the method of example 11, wherein calculating the actual interference comprises calculating, for each Azimuth angle between 0 and 360 in increments of 0.1 degree and at height intervals of 50 feet from zero to 350 feet, the actual interfering power level for all combinations of bandwidth, frequency, polarization and incumbent antenna discrimination.

Example 13 includes a method for presenting a graphical representation of the availability of microwave spectrum for one or more proposed microwave sites, the method comprising: receiving data for the one or more proposed microwave sites; receiving an indication of a search region for the proposed microwave sites; retrieving data from a database that represents the actual interfering power levels for existing microwave sites in a geographic area of the search region around the one or more proposed microwave sites; dividing a display into a plurality of geometric regions; and displaying a color in each geometric region based on the retrieved data, wherein the color of each geometric region is indicative of the availability of microwave spectrum in the geographic area of the search region represented by the geometric region of the display.

Example 14 includes the method of example 13, wherein receiving an indication of a search region includes receiving data on a minimum and maximum search radius as well as an indication of whether line of sight is required for the one or more proposed microwave sites.

Example 15 includes the method of any of examples 13-14, wherein receiving data for the one or more proposed microwave sites comprises receiving: a location of the proposed microwave system as one of latitude and longitude, an FCC call sign, or an FCC ASR; an antenna model and centerline (FT); a radio model; and a transmit power.

Example 16 includes the method of any of examples 13-15, and further comprising displaying the location of the one or more proposed microwave sites and any existing microwave sites in the search area on the geometric region.

Example 17 includes the method of example 16, wherein each existing microwave site that is displayed in the geometric region is color coded to indicate availability of spectrum to communicate with the one or more proposed microwave sites.

Example 18. A system for frequency planning for a microwave system, the system comprising: a user input device; a display for presenting a graphical representation of availability of microwave spectrum; a non-transitory storage medium configured to store a frequency planning program; a database of frequency planning data having site-specific interference data; a processor, coupled to the user input device, the display, the memory and the databases; and wherein the processor is configured to execute the frequency planning program to cause the processor to: receive data regarding a proposed microwave system via the user input device; retrieve the site-specific interference data from the database of frequency planning data for a region around the proposed microwave system; presenting a graphical representation of frequency availability on the display based on the received data and the retrieved data; and when a user input is received via the user input device, providing additional details on potential interference levels.

Example 19 includes the system of example 18, wherein receiving data regarding the proposed microwave system comprises receiving: a location of the proposed microwave system as one of latitude and longitude, an FCC call sign, or an FCC ASR; an antenna model and centerline (FT); a radio model; and a transmit power.

Example 20 includes the system of any of examples 18-19, wherein presenting a graphical representation of frequency availability comprises color coding regions on a display based on the availability of frequency channels in a corresponding geographic region.

Example 21 includes a method for automatic configuration of a network device, the method comprising: receiving data from the network device; obtaining options for an operating frequency and bandwidth from a frequency planning system; obtaining regulatory approval of the operating frequency and bandwidth; and providing configuration data to the network device based on the regulatory approval.

Example 22 includes the method of example 21, wherein receiving data from the network device comprises receiving one or more of a proposed location, height, frequency, bandwidth, Azimuth, and antenna and radio model numbers for a proposed microwave system.

Example 23 includes the method of example 22, wherein obtaining options for an operating frequency and bandwidth comprises: retrieving site-specific interference data from a database for a region around the proposed microwave system; determining the options for the operating frequency and bandwidth from the retrieved site-specific data.

Example 24 includes the method of any of examples 21-23, wherein obtaining regulatory approval comprises submitting one or more of the options for the operating frequency and bandwidth to a regulatory approval system.

Example 25 includes a method for configuring a network device, the method comprising: sending data from the network device over a communication network to a frequency planning system requesting allocation of a frequency and bandwidth of operation for the network device; receiving configuration data at the network device from a frequency planning system over the communication network, wherein the configuration data includes at least an operating frequency and bandwidth for the network device; and configuring the network device based on the configuration data.

Example 26 includes the method of example 25 wherein sending data from the network device comprises sending one or more of a proposed location, height, frequency, bandwidth, Azimuth, and model numbers for an antenna and a radio for a proposed microwave system from the radio.

Example 27 includes a method for frequency planning of a proposed communication system in a geographic area, the method comprising: receiving data regarding the proposed communication system; retrieving site-specific interference data from a database for the geographic area around the proposed communication system; generating a graphical representation of spectrum availability in the geographic area based on the received data and the retrieved data, including an indication of available areas for the proposed communication system; and presenting the graphical representation on a display.

Example 28 includes the method of example 27, wherein retrieving site specific interference data includes retrieving interference data based at least in part on the height and the terrain for the proposed communication system.

Example 29 includes the method of any of examples 27-28, wherein receiving data regarding the proposed communication system comprises receiving data related to at least the height, antenna characteristics including discrimination, and transmit power of the proposed communication system.

Example 30 includes the method of any of examples 27-29, wherein presenting a graphical representation of spectrum availability includes designating on a map, areas that can accommodate the proposed communication system and areas that cannot accommodate the proposed communication system.

Example 31 includes the method of any of examples 27-30, wherein generating a graphical representation comprises generating a color-coded map.

Example 32 includes a system for frequency planning, the system comprising: a user input device; a display for presenting a graphical representation of availability of spectrum for a proposed communication system; a non-transitory storage medium configured to store a frequency planning program; a database of frequency planning data having site-specific interference data generated based on existing communication systems; a processor, coupled to the user input device, the display, the memory and the databases; and wherein the processor is configured to execute the frequency planning program to cause the processor to: receive data regarding the proposed communication system via the user input device; retrieve the site-specific interference data from the database of frequency planning data for a region around the proposed communication system; generating a graphical representation of frequency availability on the display based on the received data and the retrieved data, including an indication of available areas for the proposed communication system; and presenting the graphical representation on the display.

Example 33 includes the system of example 32, wherein retrieving site specific interference data includes retrieving interference data based at least in part on the height and the terrain for the proposed communication system.

Example 34 includes the system of any of examples 32-33, wherein receiving data regarding the proposed communication system comprises receiving data related to at least the height, antenna characteristics including discrimination, and transmit power of the proposed communication system.

Example 35 includes the system of any of examples 32-34, wherein presenting a graphical representation of spectrum availability includes designating on a map, areas that can accommodate the proposed communication system and areas that cannot accommodate the proposed communication system.

Example 36 includes the system of any of examples 32-35, wherein generating a graphical representation comprises generating a color-coded map.

Example 37 includes a method for frequency planning of a proposed communication system in a geographic area, the method comprising: receiving data regarding the proposed communication system; retrieving site-specific interference data from a database for the geographic area around the proposed communication system using at least the data regarding the proposed communication system to select the appropriate site-specific interference data; and identifying geographic areas where the proposed communication system is allowed to be deployed without interfering with existing communication systems.

Example 38 includes the method of example 37, wherein retrieving site specific interference data includes retrieving interference data based at least in part on the height and the terrain for the proposed communication system.

Example 39 includes the method of any of examples 37-38, wherein receiving data regarding the proposed communication system comprises receiving data related to at least the height, antenna characteristics including discrimination, and transmit power of the proposed communication system.

Example 40 includes a method for generating a database, the method comprising: retrieving data from one or more databases on existing wireless transceivers; for each existing wireless transceiver, calculating the actual interfering power level at the site for selected combinations of frequency, selected antenna heights above ground level, and terrain; and storing the results for each existing wireless transceiver.

Example 41 includes the method of example 40, wherein calculating the actual interference comprises calculating interfering power levels at a plurality of discrete heights.

A number of embodiments of the invention defined by the following claims have been described. Nevertheless, it will be understood that various modifications to the described embodiments may be made without departing from the spirit and scope of the claimed invention. Accordingly, other embodiments are within the scope of the following claims.

What is claimed is:

1. A method for frequency planning of a proposed microwave system, the method comprising:
   receiving data regarding the proposed microwave system;
   retrieving data on site-specific interference generated by existing communication systems, the data retrieved from a database for a region around the proposed microwave system including data on one or more of bandwidth, frequency, polarization, selected antenna heights above ground level, discrete increments of azimuth angles, and incumbent antenna discrimination;
   presenting a graphical representation of frequency availability based on the received data and the retrieved data; and
   when a user input is received with changes to the proposed microwave system, updating the graphical representation of the frequency availability based on the changes to the proposed microwave system and the retrieved data.

2. The method of claim 1, wherein receiving the data regarding the proposed microwave system comprises receiving:
   a location of the proposed microwave system as one of latitude and longitude, an Federal Communication Commission (FCC) call sign, or an FCC Antenna Structure Registration (ASR);
   an antenna model and centerline (Feet (FT));
   a radio model; and
   a transmit power.

3. The method of claim 2, wherein receiving the data regarding the proposed microwave system further comprises receiving an indication of a search region for the proposed microwave system.

4. The method of claim 1, wherein presenting the graphical representation of the frequency availability comprises color coding regions on a display based on the availability of frequency channels in a corresponding geographic region.

5. The method of claim 1, further comprising determining the frequency availability on a site-by-site basis based in part on the site-specific interference data.

6. The method of claim 1, further adjusting the retrieved site-specific interference data based on the received data regarding the proposed microwave system.

7. A method for frequency planning of a proposed microwave system, the method comprising:
   receiving data regarding the proposed microwave system;
   retrieving site-specific interference data from a database for a region around the proposed microwave system;
   presenting a graphical representation of frequency availability based on the received data and the retrieved data; and
   when a user input is received with changes to the proposed microwave system, updating the graphical representation of the frequency availability based on the changes to the proposed microwave system and the retrieved data,
   wherein retrieving the site-specific interference data comprises retrieving the site-specific interference data by calculating the actual interfering power level at each site of the wireless communication system for selected combinations of communication parameters including bandwidth, frequency, polarization, selected antenna heights above ground level, discrete increments of azimuth angles, and incumbent antenna discrimination.

8. The method of claim 7, wherein calculating the actual interfering power level comprises calculating, for each Azimuth angle between 0 and 360 in increments of 0.1 degree and at height intervals of 50 feet from zero to 350 feet, the actual interfering power level for all combinations of bandwidth, frequency, polarization and incumbent antenna discrimination.

9. A method for presenting a graphical representation of availability of microwave spectrum for one or more proposed microwave sites, the method comprising:
   receiving data for the one or more proposed microwave sites;
   receiving an indication of a search region for the proposed microwave sites;
   retrieving data from a database that represents actual interfering power levels for existing microwave sites in a geographic area of the search region around the one or more proposed microwave sites;
   dividing a display into a plurality of geometric regions; and
   displaying a color in each of the plurality of geometric regions based on the retrieved data, wherein the color of each geometric region is indicative of the availability of microwave spectrum in the geographic area of the search region represented by the geometric region of the display.

10. The method of claim 9, wherein receiving the indication of a search region includes receiving data on a minimum and maximum search radius as well as an indication of whether line of sight is required for the one or more proposed microwave sites.

11. The method of claim 9, wherein receiving the data for the one or more proposed microwave sites comprises receiving:
   a location of the proposed microwave system as one of latitude and longitude, an Federal Communication Commission (FCC) call sign, or an FCC Antenna Structure Registration (ASR);
   an antenna model and centerline (Feet (FT));
   a radio model; and
   a transmit power.

12. The method of claim 9, further comprising displaying the location of the one or more proposed microwave sites and any existing microwave sites in the search area on the geometric region.

13. The method of claim 12, wherein each of the existing microwave sites that is displayed in the geometric region is color coded to indicate availability of spectrum to communicate with the one or more proposed microwave sites.

14. A system for frequency planning for a microwave system, the system comprising:
   a user input device;
   a display for presenting a graphical representation of availability of microwave spectrum;
   a non-transitory storage medium configured to store a frequency planning program;
   a database of frequency planning data having site-specific interference data;
   a processor, coupled to the user input device, the display, the non-transitory storage medium and the database of frequency planning data; and
   wherein the processor is configured to execute the frequency planning program to cause the processor to:
      receive data regarding a proposed microwave system via the user input device;
      retrieve the site-specific interference data from the database of frequency planning data for a region around the proposed microwave system;
      presenting the graphical representation of the availability of microwave spectrum on the display based on the received data and the retrieved data; and
      when a user input is received via the user input device with changes to the proposed microwave system, updating the graphical representation of the availability of microwave spectrum based on the changes to the proposed microwave system and the retrieved data.

15. The system of claim 14, wherein receiving the data regarding the proposed microwave system comprises receiving:
   a location of the proposed microwave system as one of latitude and longitude, an Federal Communication Commission (FCC) call sign, or an FCC Antenna Structure Registration (ASR);
   an antenna model and centerline (Feet (FT));
   a radio model; and
   a transmit power.

16. The system of claim 14, wherein presenting the graphical representation of the availability of microwave spectrum comprises color coding regions on a display based on the availability of frequency channels in a corresponding geographic region.

17. A method for frequency planning of a proposed microwave communication system in a geographic area, the method comprising:
   receiving data regarding the proposed microwave communication system;
   retrieving data on site-specific interference generated by existing communication systems, the data retrieved from a database for the geographic area around the proposed microwave communication system;
   generating a graphical representation of spectrum availability in the geographic area based on the received data and the retrieved data, including an indication of available areas in the geographic area for installation and operation of the proposed microwave communication system; and
   presenting the graphical representation on a display.

18. The method of claim 17, wherein retrieving the site specific interference data includes retrieving interference data based at least in part on height of an antenna of, and terrain associated with, the proposed microwave communication system.

19. The method of claim 17, wherein receiving the data regarding the proposed microwave communication system comprises receiving data related to at least antenna height, antenna characteristics including discrimination, and transmit power of the proposed microwave communication system.

20. A method for frequency planning of a proposed communication system in a geographic area, the method comprising:
   receiving data regarding the proposed communication system;
   retrieving site-specific interference data from a database for the geographic area around the proposed communication system;
   generating a graphical representation of spectrum availability in the geographic area based on the received data and the retrieved data, including an indication of available areas in the geographic area for the proposed communication system;

presenting the graphical representation on a display; and wherein presenting the graphical representation of spectrum availability includes designating on a map, areas that can accommodate the proposed communication system and areas that cannot accommodate the proposed communication system.

21. The method of claim 17, wherein generating the graphical representation comprises generating a color-coded map.

22. A system for frequency planning, the system comprising:

a user input device;

a display for presenting a graphical representation of availability of spectrum for a proposed communication system;

a non-transitory storage medium configured to store a frequency planning program;

a database of frequency planning data having site-specific interference data generated based on existing communication systems;

a processor, coupled to the user input device, the display, the non-transitory storage medium and the databases; and wherein the processor is configured to execute the frequency planning program to cause the processor to:

receive data regarding the proposed communication system via the user input device;

retrieve the site-specific interference data from the database of the frequency planning data for a region around the proposed communication system;

generating the graphical representation of the availability of the spectrum on the display based on the received data and the retrieved data, including an indication of available areas for the proposed communication system; and presenting the graphical representation on the display.

23. The system of claim 22, wherein retrieving the site specific interference data includes retrieving interference data based at least in part on a height of an antenna of, and terrain surrounding, the proposed communication system.

24. The system of claim 22, wherein receiving the data regarding the proposed communication system comprises receiving data related to at least antenna height, antenna characteristics including discrimination, and transmit power of the proposed communication system.

25. The system of claim 22, wherein presenting the graphical representation of the availability of the spectrum includes designating on a map, areas that can accommodate the proposed communication system and areas that cannot accommodate the proposed communication system.

26. The system of claim 22, wherein generating the graphical representation comprises generating a color-coded map.

27. A method for frequency planning of a proposed microwave communication system in a geographic area, the method comprising:

receiving data regarding the proposed microwave communication system;

retrieving data on site-specific interference generated by existing communication systems, the data retrieved from a database for the geographic area around the proposed microwave communication system using at least the data regarding the proposed communication system; and identifying available areas within the geographic area where one or more frequencies of the proposed microwave communication system is allowed to be installed and operated without interfering with the existing communication systems in the geographic area.

28. The method of claim 27, wherein retrieving the site specific interference data includes retrieving interference data based at least in part on a height of an antenna of, and terrain surrounding, the proposed microwave communication system.

29. The method of claim 27, wherein receiving data regarding the proposed microwave communication system comprises receiving data related to at least antenna height, antenna characteristics including discrimination, and transmit power of the proposed microwave communication system.

* * * * *